UNITED STATES PATENT OFFICE.

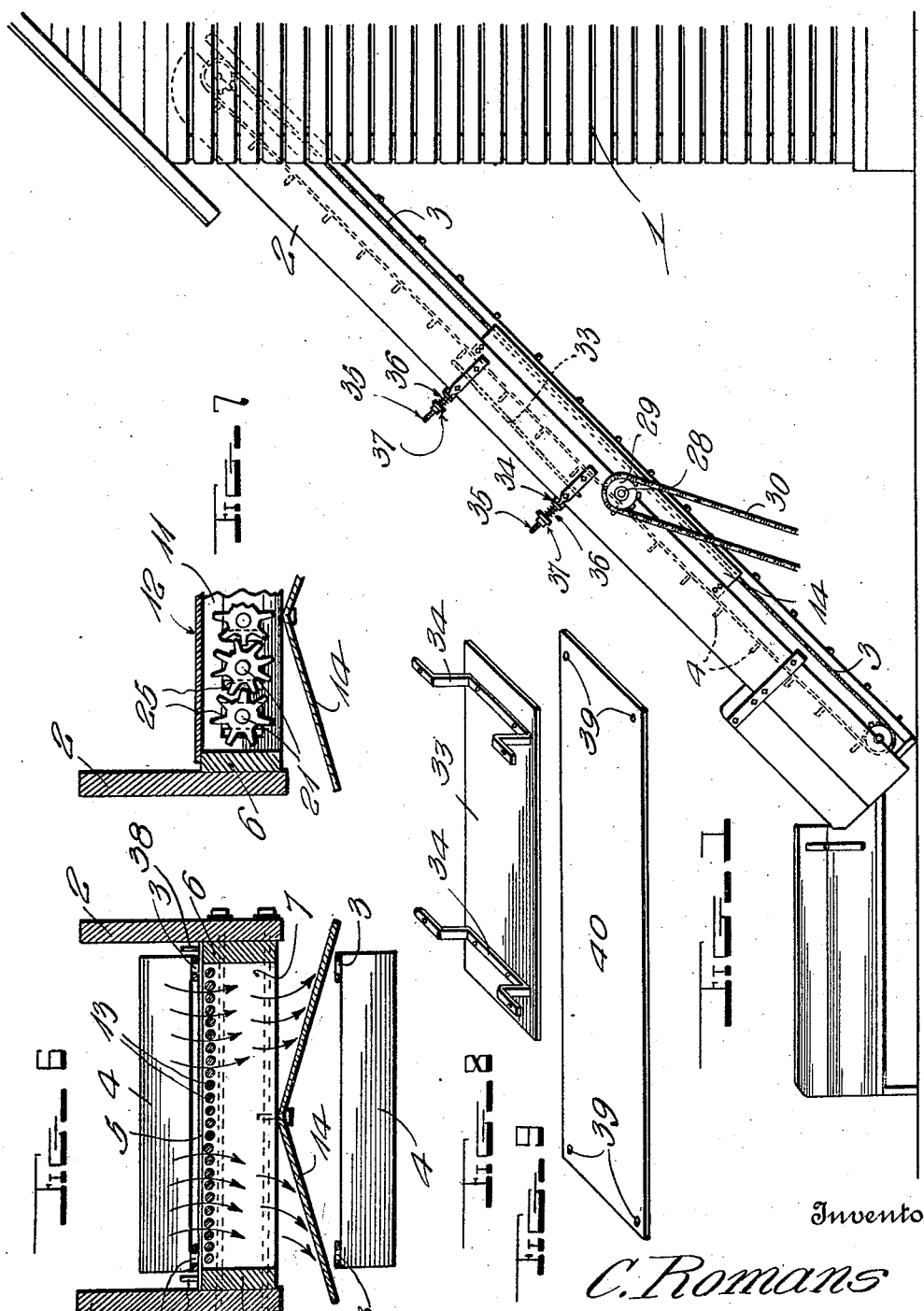

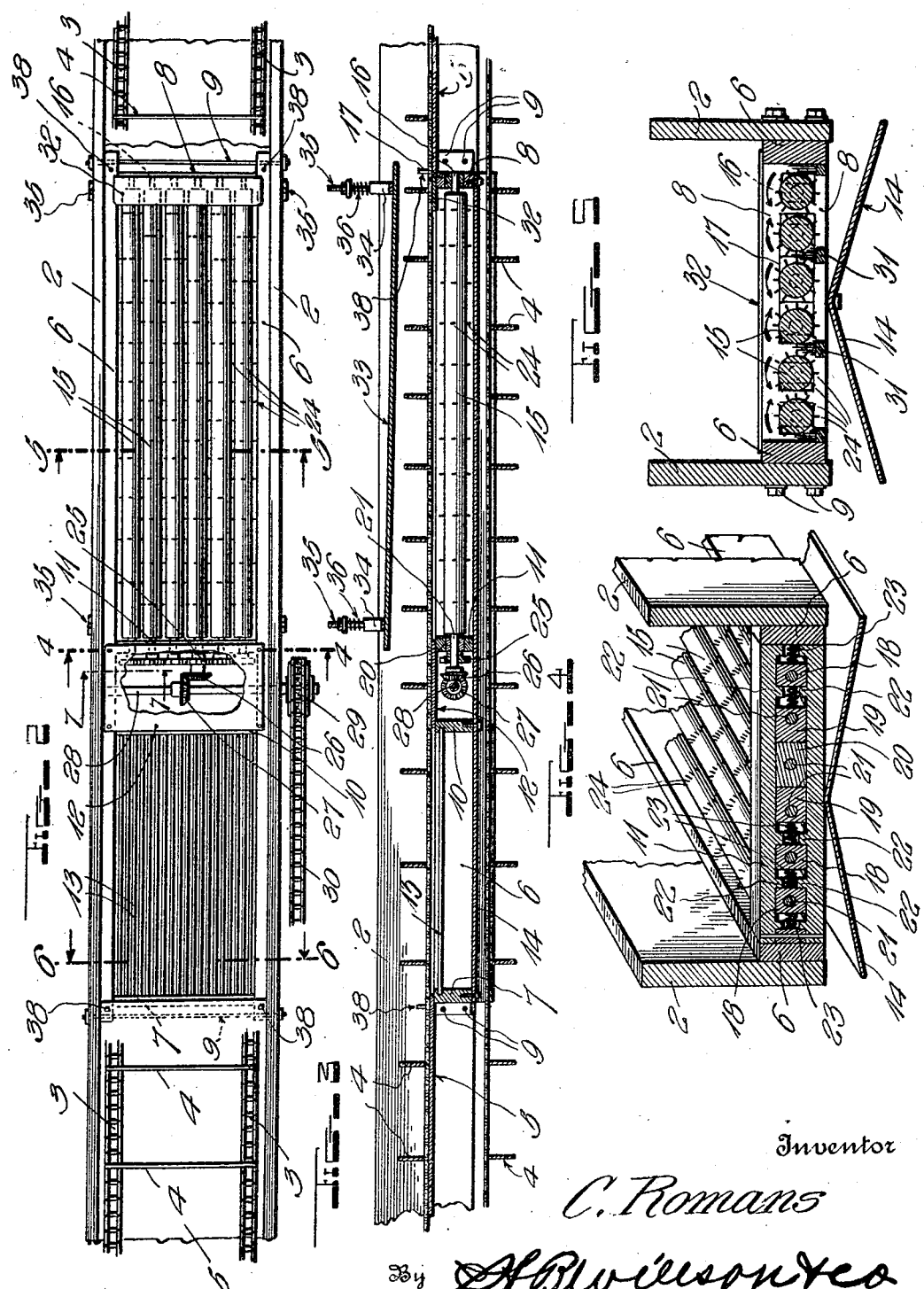

CHARLES ROMANS, OF BLOOMINGTON, ILLINOIS.

EAR-CORN CLEANER.

1,413,617.  Specification of Letters Patent.  Patented Apr. 25, 1922.

Application filed September 22, 1921. Serial No. 502,431.

*To all whom it may concern:*

Be it known that I, CHARLES ROMANS, a citizen of the United States, residing at Bloomington, in the county of McLean and State of Illinois, have invented certain new and useful Improvements in Ear-Corn Cleaners; and I do declare the following to be a full, clear, and exact description of the invention, such as will enable others skilled in the art to which it appertains to make and use the same.

This invention has reference to a cleaner for ears of corn, and it has for its principal object to provide an attachment arranged for securement in the frame of any endless conveyor or elevator, preferably of the portable type, and which serves to screen loose corn and to strip the silks and shucks which cling to the ears of corn.

The invention has for a further object to provide a cleaner attachment in which the rows of corn may be pressed into close contact with the stripping rollers which extend longitudinally of the attachment and rotate transversely of the same.

A further object of the invention is to provide stripping rollers which are rotatably mounted in an improved manner so that the rollers will be yieldingly held in close contact but permitted to have movement away from each other, thus permitting shucks to pass easily between the rollers.

Another object of the invention is to so construct the attachment that the stripping rollers may be rotated from the driving means of the endless conveyor.

That the invention may be more fully understood reference is had to the accompanying drawings forming a part of this description, illustrating a preferred embodiment of the invention, in which:—

Figure 1 is a side elevation of one conventional form of portable elevator with my cleaning attachment associated therewith;

Figure 2 is a top plan view showing the attachment in connection with a conveyor or elevator frame;

Figure 3 is a longitudinal sectional view through the structure shown in Figure 2;

Figure 4 is a transverse sectional view taken on the line 4—4, Figure 2;

Figure 5 is a transverse sectional view taken on the line 5—5, Figure 2;

Figure 6 is a transverse sectional view taken on the line 6—6, Figure 2;

Figure 7 is a transverse sectional view taken on the line 7—7, Figure 2;

Figure 8 is a perspective view of the pressure plate for holding the ears of corn in proper engagement with the stripping rollers, and Figure 9 is a perspective view of a cover plate which may be put in place when it is desired to cover the opening made in the bottom of the conveyor or elevator frame.

Like characters of reference denote corresponding parts throughout the figures.

My ear corn cleaner attachment, as previously stated, is arranged for securement to conveyors or elevators, preferably portable grain elevating machines, for conveying ears of corn to the bins of a suitable storage crib 1. A conventional form of conveyor or elevator includes the side bars 2, the endless sprocket chains 3 and flights 4 connected thereto movable on a bottom strip 5 secured between the side bars 2.

In order to attach my cleaner attachment to a conveyor or elevator, the bottom strip 5 is preferably cut away for a portion of its length and said attachment is secured in lieu thereof, in manner shown, in Figures 2 and 3. Said attachment includes the side bars 6 and end bars 7 and 8. The end bars being secured between the side bars, and the side bars adapted to be detachably or removably connected to the side bars 2 of the conveyor or elevator frame, by suitable securing means, such as bolts 9. Said attachment also includes cross bars 10 and 11 which are secured between the side bars 6 intermediate their ends, and the space between said cross bars 10 and 11 is covered by a plate 12 which prevents the ears of corn dropping down and between said cross bars when the endless conveying means of the conveyor or elevator is in operation. One end of the attachment, which is known as the receiving end, serves as the screening portion of said attachment, and the opposite or delivery end, is termed the cleaning or stripping portion.

The screen is to permit loose kernels of corn to be sifted from the ears of corn which are being conveyed to the delivery end of the conveyor or elevator frame, and in the form illustrated, said screen is formed from a plurality of closely spaced rods 13 which extend longitudinally of the attachment in the receiving end portion thereof and said rods have their end portions journaled in suitable sockets formed in the cross bars 10 and 11. Said rods 13 are spaced substantially as shown in Figure 6, so that as the ears of corn are conveyed by the conveyor flights 4, the loose kernels of corn may pass down and between these rods. In order to carry the kernels of corn to the side of the conveyor or elevator frame and permit the same dropping into suitable receptacles, which may be provided, there is provided a deflector plate 14 which is secured to the attachment frame and held in place by suitable securing means. This deflector plate extends the length of the attachment and is bent longitudinally, thus providing side portions which slope downwardly, as shown in Figures 4, 5 and 6, and extend beyond the bottom strip of the conveyor or elevator, as shown in Figure 6. The loose kernels of corn will thus be carried beyond the flights 4 and may readily drop into suitable receptacles provided to receive the same. Said deflector plate, as stated, extends beneath the cleaning or stripping section of the attachment as well as beneath the screening section thereof and silks and shucks which pass between the stripping rollers will drop upon the ground or into suitable receptacles which may be provided to receive the same.

The stripping rollers, designated 15, extend longitudinally of the attachment between the cross bars 8 and 11 and are provided at one end wtih shafts 16 which are journalled in block 17 mounted in the cross bar 8, which said blocks have a construction similar to blocks 18, 19 and 20, which are mounted in the cross bar 11 and receive shafts 21 which extend from the opposite end of the rollers 15. From an inspection of Figure 4 it will be observed that the block 20 for the central stripping roller will be stationary and that the remaining blocks are slidably mounted. It will be further noted that the cross bar 11 is provided with spacers 22 to limit the sliding movement of the blocks 18 and 19 and that springs 23 are provided to yieldingly hold these blocks in the proper position shown and thus normally retain the rollers 15 in the proper spaced relation, as shown in Figure 5. The springs will, however, permit the stripping rollers to move transversely of the attachment and thus provide greater space between the stripping rollers in order to permit the shucks to pass easily between the same. Said stripping rollers cannot, however, move apart a sufficient distance to permit an ear of corn to pass between the same. The stripping rollers are provided with teeth 24 for engaging the silk and shucks and thus removing all of the silk and shucks which may adhere to the ears of corn.

When the attachment is in use, the stripping rollers rotate in the direction indicated by the arrows shown in Figure 5 and in order to provide for such rotation, there are provided gear wheels 25 which are carried by the shafts 21. The shaft of the stripping roller which is held against sidewise movement is extended beyond the gear wheel 25 carried thereby and said shaft has connected thereto a beveled gear wheel or pinion 26 which meshes with a beveled gear wheel or pinion 27 connected to a shaft 28 which extends transversely through the attachment frame between the cross bars 10 and 11, and one end of said shaft 28 extends through one of the side bars 2 of the conveyor or elevator frame. A sprocket wheel 29 is mounted upon the protruding end of the shaft 28 and said sprocket wheel is engaged by a sprocket chain 30 which may lead to a suitable source of power, or preferably, be connected with the same source of power used for operating the endless conveyor. When the stripping rollers are rotating and the silk and shucks are picked from the ears of corn, it is desirable to remove the same from the teeth 24 of the rollers and therefore I have provided brushes 31 which are positioned between the lower portions of said stripping rollers. When said rollers are rotated, the teeth thereof are passed through the brushes and the silk and shucks will thus be wiped off of the teeth and will drop down upon the inclined or sloping side portions of the deflector plate 14.

To connect my attachment with a conveyor or elevator frame the bottom strip 5 thereof will be cut away to provide an open space therein and the attachment will then be mounted in the conveyor or elevator frame with the end portions of the opposite sections of the bottom strip preferably overlapping the ends of the attachment, as shown in Figure 2. The cover plate 12 prevents the corn from dropping down between the cross bars 10 and 11 and the cover plate 32 prevents the corn from working between the stripping rollers and the cross bar 8. Said cover plate 32 may, if desired, be a tongue extension forming a part of the bottom strip 5 of the conveyor or elevator. The ears of corn are conveyed by the flights 4 of the endless conveyor and as they are moved over the screen portion of the attachment, the loose kernels of corn will drop between the rods 13 onto the side portions of the deflector plate 14 and will be directed to the side edges thereof and drop into suitable receptacles which may be provided to receive the same. After passing over the screen portion of the attachment, the ears of corn will be carried across the plate 12 onto the stripping rollers 15 and along such rollers. As the ears of corn are moved along the stripping rollers the teeth thereof will engage the silk and shucks adhering to the ears, pick it off and carry the same downwardly and between the rollers and then either dropped directly upon the deflector plate or wiped off of the teeth or prongs by the brushes 31 and dropped upon the deflector plate, from which the silk and shucks will drop onto the ground or into suitable receptacles arranged to receive the same. As the ears or corn are carried along the rollers 15, it is desired to have such ears pressed into close contact with the stripping rollers and thus permit the teeth thereon to readily engage the silk and shucks. Such pressure means includes a plate 33 which extends longitudinally of the conveyor above the cleaning or stripping portion of the attachment, and said plate is provided at or near its ends with yokes 34 which extend upwardly and are provided with outstanding arms having openings formed therein to receive threaded stems or rods 35 which extend upwardly from the side bars of the conveyor or elevator frame. Springs 36 are placed upon these stems or rods 35 and securing nuts 37 are screwed upon the rods and engage the springs to compress the same and thus provide the desired tension which will cause the springs to yieldably hold the pressure plate against upward movement. It is to be noted that the pressure plate extends at an incline in the conveyor or elevator frame with the end at the delivery end of the stripping rollers in closer relation thereto than the end at the receiving end of said rollers. Therefore, the ears of corn will be in much closer contact with the rollers as they reach the delivery end of the attachment and thus insure the removal of all silk and shucks from the ears of corn. It will thus be seen that with this attachment the ears of corn which are conveyed by the endless conveyor in the conveyor or elevator and dumped into the crib 1 will be thoroughly screened and cleaned as they are conveyed through the conveyor or elevator frame. The loose grains of corn will be saved and the silk and shucks removed and deposited where they may be readily collected and used for any purpose, or thrown away.

When it is desired to use a conveyor or elevator supplied with my attachment, for conveying small grain, it is desirable to cover the attachment and opening in the bottom of the conveyor or elevator frame so that small grain or other material may be prevented from falling between the rods 13 and the stripping rollers 15. Therefore, there are provided pins 38 adapted to pass through openings 39 formed in the corner portions of a sheet metal cover plate 40 arranged to be placed in the conveyor or elevator frame beneath the upper flight of the endless conveyor and also to cover the opening formed in the bottom thereof and have its end portions resting upon the sections of the bottom strip 5 and its side portions supported by the side bars 6 of the attachment.

What I claim is:

1. An ear corn cleaning attachment for conveyors or elevators, comprising a frame arranged for securement thereto between the delivering and return endless conveying means therein, and means in said frame for stripping silk and shucks adhering to the ears of corn as the same are conveyed over said frame.

2. An ear corn cleaning attachment for conveyors or elevators, comprising a frame arranged for securement thereto between the delivering and return endless conveying means therein, means in said frame for stripping silk and shucks adhering to the ears of corn as the same are conveyed over said frame, and means for actuating said stripping means.

3. An ear corn cleaning attachment for conveyors or elevators, comprising a frame arranged for securement thereto between the delivering and return endless conveying means therein, means in said frame for stripping silk and shucks adhering to the ears of corn as the same are conveyed over said frame, pressure means for the ears of corn associated with said stripping means, and means for actuating said stripping means.

4. An ear corn cleaning attachment for conveyors or elevators, comprising a frame arranged for securement thereto between the delivering and return endless conveying means therein, a shelled corn screening means in said frame, and silk and shuck stripping means in said frame, said screening means located in advance of said stripping means to screen the shelled corn preceding such stripping operation.

5. An ear corn cleaning attachment for conveyors or elevators, comprising a frame arranged for securement thereto between the delivering and return endless conveying means therein, a shelled corn screening means in said frame, silk and shuck stripping means in said frame, said screening means located in advance of said stripping means to screen the shelled corn preceding such stripping operation, and pressure means for the ears of corn associated with said stripping means.

6. An ear corn cleaning attachment for conveyors or elevators, comprising a frame arranged for securement in said conveyor or elevator in lieu of a portion of the bottom strip thereof, a shelled corn screening means in said frame, a silk and shuck stripping means in the said frame, said screening means located in advance of said stripping means to screen the shelled corn preceding such stripping operation, and means for actuating said stripping means.

7. An ear corn cleaning attachment for conveyors or elevators, comprising a frame arranged for securement in said conveyor or elevator in lieu of a portion of the bottom strip thereof, a shelled corn screening means in said frame, a silk and shuck stripping means in said frame, said screening means located in advance of said stripping means to screen the shelled corn preceding such stripping operation, means to yieldingly press the ears of corn into contact with said stripping means, and means for actuating said stripping means.

8. An ear corn cleaning attachment for conveyors or elevators, comprising a frame arranged for securement to the frame of the conveyor or elevator, a screening means in said frame for shelled corn, stripping means in said frame for removing the silks and shucks adhering to the ears of corn, said screening means located in advance of said stripping means to screen the shelled corn preceding such stripping operation, pressure means associated with said stripping means, means for actuating said stripping means, and deflecting means for the shelled corn below said screening means.

9. An ear corn cleaning attachment for conveyors or elevators, comprising a frame, means for attaching said frame to the conveyor or elevator frame, a screening means in said frame and a cleaning means in said frame, said screening means including a plurality of elongated closely spaced members and said cleaning means including a plurality of elongated revoluble members provided with stripping teeth, said screening means located in advance of said stripping means to screen the shelled corn preceding such stripping operation, means for actuating said revoluble members, and pressure means for the ears of corn associated with said cleaning means.

10. An ear corn cleaning attachment for conveyors or elevators, comprising a frame, means for attaching said frame to the conveyor or elevator frame, a screening means in said frame and a cleaning means in said frame, said screening means including a plurality of elongated closely spaced members and said cleaning means including a plurality of elongated revoluble members provided with stripping teeth, said screening means located in advance of said stripping means to screen the shelled corn preceding such stripping operation, means for actuating said revoluble members, pressure means for the ears of corn associated with said cleaning means, and deflecting means for the shelled corn arranged below said screening means.

11. In an apparatus of the character described, in combination, a conveyor or elevator, endless conveying means therein, a frame arranged for securement to the conveyor or elevator frame, shelled corn screening means in said frame, means also in said frame for stripping silk and shucks adhering to the ears of corn, said screening means located in advance of said stripping means to screen the shelled corn preceding such stripping operation, and means for actuating said stripping means.

In testimony whereof I have hereunto set my hand.

CHARLES ROMANS.